(12) United States Patent
Ginczek et al.

(10) Patent No.: US 12,188,595 B2
(45) Date of Patent: Jan. 7, 2025

(54) PLUG-TYPE COUPLING WITH PRE-ASSEMBLY LOCKING

(71) Applicant: VOSS AUTOMOTIVE GMBH, Wipperfürth (DE)

(72) Inventors: Maurice Ginczek, Marienheide (DE); Eugen Heinrichs, Bergneustadt (DE); Swen Gmeiner, Marienheide (DE)

(73) Assignee: VOSS Automotive GmbH, Wipperfürth (DE)

( * ) Notice: Subject to any disclaimer, the term of this patent is extended or adjusted under 35 U.S.C. 154(b) by 129 days.

(21) Appl. No.: 17/912,716

(22) PCT Filed: Mar. 4, 2021

(86) PCT No.: PCT/EP2021/055464
§ 371 (c)(1),
(2) Date: Sep. 19, 2022

(87) PCT Pub. No.: WO2021/190897
PCT Pub. Date: Sep. 30, 2021

(65) Prior Publication Data
US 2023/0243449 A1    Aug. 3, 2023

(30) Foreign Application Priority Data
Mar. 24, 2020    (DE) .................... 10 2020 108 073.5

(51) Int. Cl.
*F16L 37/088* (2006.01)
*F16L 37/084* (2006.01)

(52) U.S. Cl.
CPC ....... *F16L 37/0885* (2019.08); *F16L 37/0841* (2013.01); *F16L 37/0887* (2019.08)

(58) Field of Classification Search
CPC ............... F16L 37/0841; F16L 2201/20; F16L 37/0887; F16L 37/0885; F16L 37/088
See application file for complete search history.

(56) References Cited

U.S. PATENT DOCUMENTS 3,922,011 A  *  11/1975  Walters .................. F16L 37/088
                                                               285/902
8,555,480 B2    10/2013  Poder
(Continued)

FOREIGN PATENT DOCUMENTS

AT              512397 B1  *  8/2013  ............ F16L 37/088
DE       102008046143 A1  *  3/2010  ............ F16L 37/088
(Continued)

*Primary Examiner* — Zachary T Dragicevich
*Assistant Examiner* — James A Linford
(74) *Attorney, Agent, or Firm* — Honigman LLP; Eric J. Sosenko; Jonathan P. O'Brien

(57) ABSTRACT

A plug-type coupling for connecting first and second fluid lines or a sub-assembly, which are designed with a mating plug-type coupling. The plug-type coupling including a housing including a sleeve section with a receiving channel (8) for axially receiving an adapter sleeve. The adapter sleeve being removably held in a positive-locking manner. The adapter sleeve includes a through-opening for a plug shaft of the mating plug-type coupling and a retaining means for removable attachment of the mating plug-type coupling. In an assembled state, the retaining means axially blocks the mating plug-type coupling with respect to the assembly axis. A locking element is arranged on an outer circumference of the sleeve section and is axially movable from a release position, which releases the retaining means, into a locking position, which locks the retaining means. In the release position, the locking element is fixed against axial movement into the locking position.

21 Claims, 9 Drawing Sheets

(56) References Cited

U.S. PATENT DOCUMENTS

| | | | |
|---|---|---|---|
| 2014/0210204 A1 | 7/2014 | Nishino et al. | |
| 2015/0145243 A1 | 5/2015 | Dude | |
| 2019/0107234 A1 | 4/2019 | Corbett et al. | |
| 2019/0242508 A1* | 8/2019 | Gaurat | F16L 37/0885 |
| 2021/0054957 A1* | 2/2021 | Gocha | F16L 37/0885 |

FOREIGN PATENT DOCUMENTS

| | | | |
|---|---|---|---|
| DE | 102012106925 A1 | 6/2014 | |
| DE | 112012003590 T5 | 6/2014 | |
| EP | 2728236 A2 * | 5/2014 | F16L 37/084 |
| EP | 3584489 A1 * | 12/2019 | F16L 37/088 |
| FR | 2891889 A1 * | 4/2007 | F16L 37/082 |
| WO | 2015/180875 A1 | 12/2015 | |
| WO | 2015/181396 A1 | 12/2015 | |
| WO | WO-2016021612 A1 * | 2/2016 | F16L 37/088 |
| WO | WO-2018019422 A1 * | 2/2018 | F16L 37/0982 |
| WO | WO-2018102213 A1 * | 6/2018 | F16L 37/0885 |
| WO | WO-2019103802 A1 * | 5/2019 | F16L 37/088 |

* cited by examiner

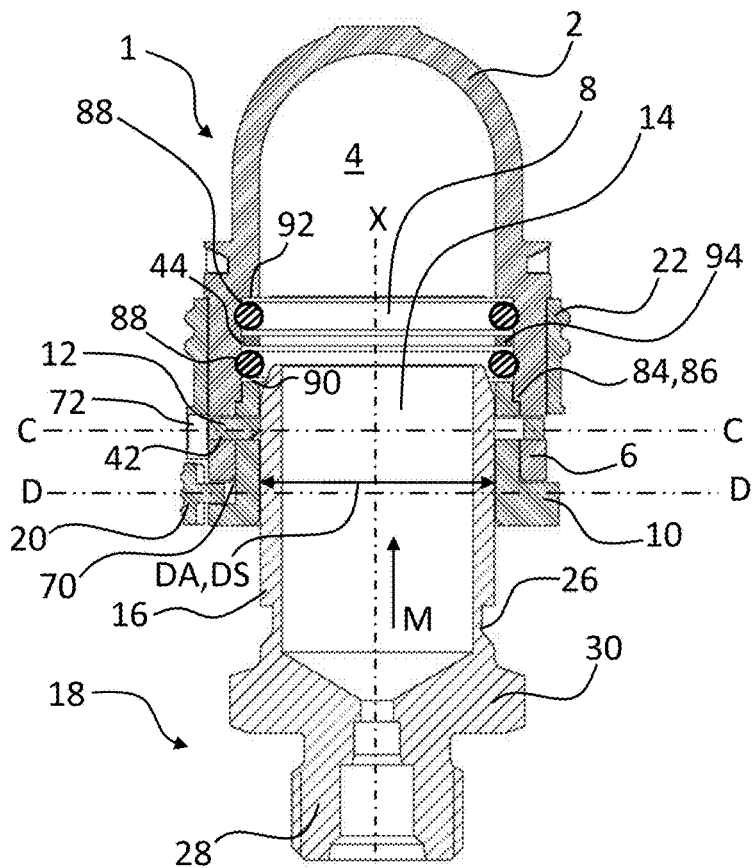
Fig. 10
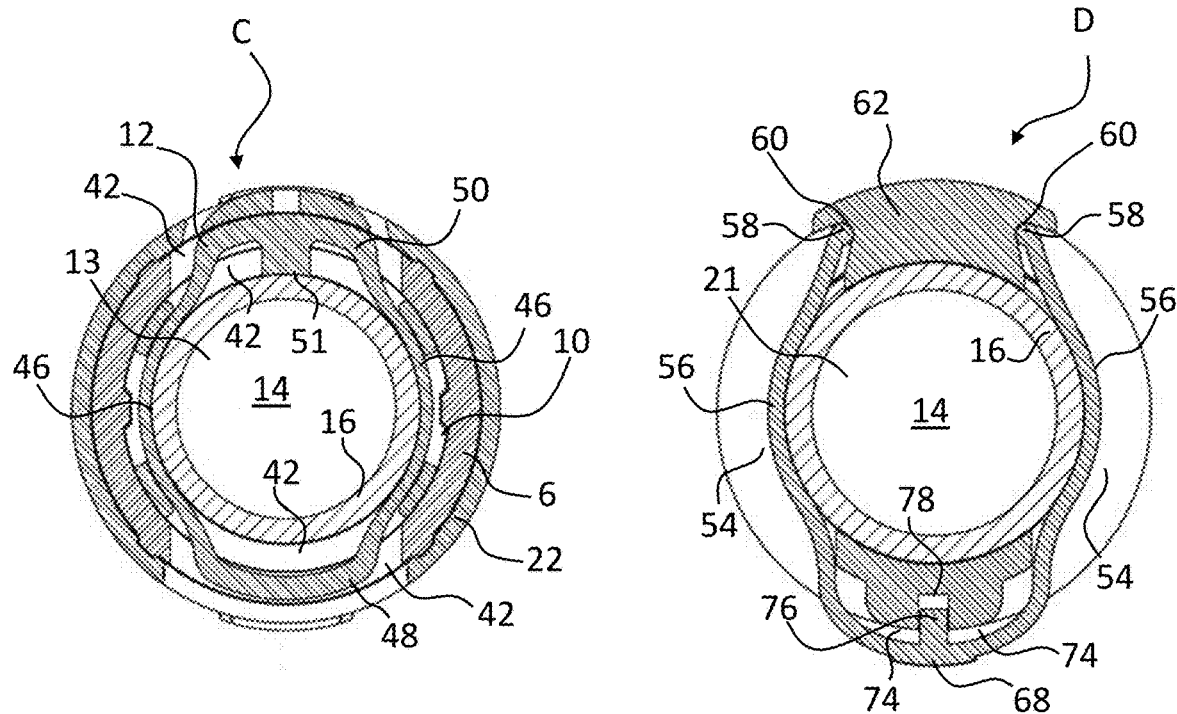
Fig. 11
Fig. 12

PLUG-TYPE COUPLING WITH PRE-ASSEMBLY LOCKING

BACKGROUND

The invention relates to a plug-type coupling for connecting at least one first fluid line to a second fluid line which is designed with a mating plug-type coupling or for connecting a sub-assembly which is designed with a mating plug connector. The plug-type coupling comprises a housing with a through-channel, wherein one end of the housing is designed as a sleeve section with a receiving channel which is connected in a fluid-tight manner to the through-channel, for receiving an adapter sleeve. The adapter sleeve can be inserted into the receiving channel of the sleeve section in an assembly direction which is oriented axially to an assembly axis, and is held by a positive lock in the receiving channel and is removable in an axial direction. The adapter sleeve has a through-opening which is designed for a plug shaft of the mating plug-type coupling and features a retaining means for removable attachment of the mating plug connector. The retaining means protrudes into the through-opening in a resting state and is designed to be expandable radially in relation to the assembly axis when in a tensioned state. The plug shaft of the mating plug-type coupling can be inserted into the through-opening of the adapter sleeve in a pre-assembly state, and in an assembled state of the plug-type coupling the retaining means can block the mating plug-type coupling axially to the assembly axis. Furthermore, a locking element which is movable in an axial direction relative to the assembly axis is arranged on an outer circumference of the sleeve section, movable from a release position which releases the retaining means into a locking position which locks the retaining means.

Mating plug connectors of the specified type feature a plug shaft and a locking groove designed behind the plug shaft in the assembly direction. After the mating plug-type coupling is inserted into the plug-type coupling or into the adapter sleeve arranged in the mating plug connector, the retaining means engages into the locking groove of the mating plug-type coupling and blocks any axial movement of the mating plug-type coupling opposite the assembly direction.

A generic plug-type coupling for connecting of the mating plug-type coupling is known from WO 2015/181396 A1. For this plug connector, the adapter sleeve features locking lugs extending in the assembly direction, which in an inserted state engage into recesses in a circumferential wall of the sleeve section in an axial direction in a positive-locking latching manner. Furthermore, the aforementioned plug-type coupling features locking arms which extend opposite the assembly direction, which engage into the locking groove of the mating plug-type coupling by actuating protrusions and prevent movement of the mating plug-type coupling opposite the assembly direction.

It has proven to be disadvantageous that the locking lugs, which hold the adapter sleeve in the sleeve section in a positive-locking manner, must have such large dimensions that, for a given installation space for the connection, only a circumferential seal can be arranged for the sealing of a circumferential gap between an inner wall of the receiving channel and the plug shaft of the mating plug connector. In particular for mating plug connectors with a plug diameter greater than 14 mm, the usability of the known embodiment is limited.

Furthermore, in the case of the known design, leakage can occasionally occur under high internal pressures and temperatures when the mating plug-type coupling is pushed out of the plug-type coupling opposite the assembly direction. This can be enhanced for example by improper usage and/or by outside influences. Therefore the embodiment according to WO 2015/181396 A has only limited applications with regard to the prevailing internal pressure and/or prevailing temperature.

In order to avoid undesired detachment of the mating plug connector, WO 2015/181396 A1 provides a locking element arranged on the outer circumference of the sleeve section. The locking element is arranged so that it can slide axially with respect to the assembly axis, wherein the locking element in a locking position prevents radial spreading of the locking arms, and thus prevents release of the mating plug connector. In this regard it has been shown that the locking element can also slip into the locking position without an inserted mating plug-type coupling and thus prevent insertion of the mating plug connector, which increases the assembly effort.

An additional disadvantage is the locking arms, which cover the plug shaft of the mating plug-type coupling over a certain axial length to preserve the radial elastic properties, but only cover a small surface area of the mating plug connector. Especially in the case of large structural dimensions and vibrations, in particular in the case of mating plug connectors with a plug diameter greater than 14 mm, a failure and a detachment of the mating plug-type coupling from the plug-type coupling can therefore occasionally occur.

SUMMARY

The object of the invention is to provide a plug-type coupling which preferably functions with a mating plug-type coupling known from the prior art, and which overcomes the disadvantages known from the prior art, in particular at least by reducing the assembly effort.

This object is inventively achieved by the features of the characterizing portion of claim 1. Due to the fact that when the locking element is in its release position in the pre-assembly position of the plug connector, it is at least axially fixed against movement into the locking position on the sleeve section, the invention thus prevents the locking element from moving into a locking position axially to the assembly axis in the event that a mating plug-type coupling is not inserted—or not inserted sufficiently deeply—into the plug-type coupling or into the adapter sleeve.

In one advantageous embodiment of the invention, a positive-locking element affixes the adapter sleeve in the receiving channel in an axial direction to the assembly axis in a positive-locking manner. In particular, the positive-locking element extends into the through-opening of the adapter sleeve in a resting state and is designed to be expandable radially in relation to the assembly axis when in a tensioned state. Herein it is expedient that the positive-locking element and/or the retaining means are elastically expandable from their respective resting state into the tensioned state by means of an at-least radially outwardly-operating force with respect to the assembly axis.

By means of this embodiment, it is advantageously possible that the plug shaft exerts a radially outwardly-operating force on the positive-locking element and/or the retaining means upon insertion into the through-opening, and upon insertion of the mating plug-type coupling in the assembly direction or pulling back opposite the assembly direction, the respective element is thereby transferred into a tensioned state and/or a resting state.

Upon assembly, the mating plug-type coupling is inserted by its plug shaft into the through-opening in the assembly direction. The plug shaft thereby passes a segment in the through-opening in which the retaining means is arranged, and a segment in which the positive-locking element is arranged. Preferably the plug shaft, the positive-locking element, and the retaining means are designed in a corresponding manner with one another such that the plug shaft exerts a force radially to the assembly axis in an outward direction against the retaining means and the positive-locking element, and the retaining means and the positive-locking element are thereby elastically deformed in a radially outward direction.

In a known manner, the mating plug-type coupling features a locking groove behind the plug shaft, which has a smaller diameter than the plug shaft. In the assembled position of the plug connector, the retaining means expediently lies adjacent to the locking groove of a fully inserted mating plug connector, so that the retaining means can revert from its expanded tensioned state in the area of the locking groove back into its original form in the resting state. Axial movement of the mating plug-type coupling opposite the assembly direction is thereby advantageously blocked in a positive-locking manner.

Since the mating plug-type coupling advantageously adjusts the tensioned state and the resting state of the retaining means and/or the positive-locking element, it is possible to control the insertion depth of the mating plug-type coupling during and after insertion, in that the status of the retaining means and/or of the positive-locking element are controlled to the resting state or the tensioned state.

In particular, the positive-locking element is designed as a locking clamp and has two clamping arms. In the resting state, the clamping arms protrude into the through-opening of the adapter sleeve, wherein the clamping arms preferably feature at least one abutment segment. The clamping arms are expediently connected via the abutment segment, wherein the abutment segment is arranged in particular in an opening in the sleeve section and is overlapped on one side by the locking element.

Preferably, the sleeve section and the adapter sleeve respectively feature at least one opening positioned radially with respect to the assembly axis. At least one opening of the adapter sleeve and the sleeve section respectively are expediently arranged adjacent to one another in a fixed state of the adapter sleeve in the sleeve section such that the positive-locking element, in particular a positive-locking element designed as a locking clamp, can be inserted radially to the assembly axis through the openings of the adapter sleeve and the sleeve section into the through-opening of the adapter sleeve.

The positive-locking element expediently protrudes outward radially to the assembly axis out of the opening of the adapter sleeve. The positive-locking element thereby advantageously blocks the movement of the locking element from its release position into the locking position when in the resting state.

Preferably, the adapter sleeve features two open windows positioned opposite one another at 180° radially with respect to the assembly axis. The windows are arranged axially separated from the openings with respect to the assembly axis. In particular, the windows are furthermore arranged offset by 90° to the openings around the assembly axis. The retaining means expediently features two retaining arms, with which it surrounds the windows and protrudes through the windows into the through-opening of the adapter sleeve in the resting state.

In particular, the retaining arms always trend toward the resting state due to their elasticity, whereby they must be actively forced into the tensioned state. It is particularly advantageous if the retaining arms surround the mating plug-type coupling when it is inserted in the insertion direction or is arranged in the through-opening in an assembled state.

Preferably, the plug shaft of the mating plug-type coupling and the through-opening are designed as being cylindrical. The plug shaft of the mating plug-type coupling expediently features a diameter which is greater than the largest distance between the retaining arms perpendicularly through the assembly axis in the resting state of the retaining arms. In particular, the greatest distance between the retaining arms perpendicularly through the assembly axis in the expanded tensioned state of the retaining arms is identical to the diameter of the plug shaft.

In an additional embodiment, the retaining arms feature at least one contact segment. Each of the retaining arms expediently features a contact segment. The contact segment is advantageously arranged in a contact groove, which is designed in a contact element or an internal wall of the adapter sleeve. It is particularly advantageous that two contact grooves open in a circumferential direction are arranged in one contact element. The contact groove(s) are advantageously supporting and retaining elements for the retaining arms, so that the retaining arms are self-supporting and hook into the contact grooves at least radially with respect to the assembly axis and thereby can be retained in an installation position in or on the adapter sleeve.

The retaining means expediently protrudes with an actuation means radially outward with respect to the assembly axis from an outer circumference of the adapter sleeve, or rather, protrudes from the opening from the adapter sleeve. In particular, the maximum radial distance of the actuation means to the outer circumference of the adapter sleeve in the resting state is greater than when in the tensioned state. It is particularly advantageous that the retaining means can be elastically deformed from the resting state into the expanded tensioned state by a force acting on the actuation means radially from the outside, wherein in particular the actuation means is arranged opposite the contact groove. The retaining means is thereby advantageously supported radially to the assembly axis with the contact segment in the contact groove. The retaining means is compressed by the force acting radially from the outside and is elastically deformed from the resting state into the expanded tensioned state. The maximum distance of the retaining arms through the assembly axis is thereby enlarged such that this distance corresponds at least to the diameter of the plug shaft of the mating plug connector.

When the mating plug-type coupling is not inserted far enough into the through-opening in the assembly direction such that the locking groove is not located adjacent to the retaining means, then the retaining means in its tensioned state, expediently with the actuation means, blocks the movement of the locking element from the release position into the locking position. A blockage of the movement of the locking element into the locking position has the advantage that the user has an additional insertion control.

In order to advantageously prevent an undesired separation of the mating plug-type coupling from the plug connector, the locking element engages into a clearance space with at least one tab protruding axially from the locking element opposite the assembly direction. The clearance space is expediently designed to pass axially between the actuation means and the adapter sleeve. The retaining means is thereby expediently fixed radially with respect to the assembly axis in the resting state, and a force acting radially from the outside in the direction of the assembly axis cannot displace the retaining means from the resting state into the tensioned state.

It is especially advantageous that at least one sealing element is arranged in the receiving channel, preferably at least two sealing elements. The sealing element is advantageously designed as an O-ring. The sealing element is expediently arranged between a side wall of the adapter sleeve facing in the assembly direction and a step surface facing away from the assembly direction and extending perpendicularly from an inner wall of the receiving channel. Preferably, the sealing element thereby creates a seal in particular against an inner wall of the receiving channel.

A three-part seal has proven to be particularly advantageous, wherein the use of this seal is only possible due to the use of the inventive plug connector. The seal accordingly features two sealing elements, in particular O-rings, which are separated from one another by a spacer ring. This three-part group is then arranged as previously stated.

Additional advantageous embodiments of the invention arise from the following description of figures and the dependent subordinate claims.

BRIEF DESCRIPTION OF THE DRAWINGS

FIG. 10 is a sectional view along the assembly axis X according to FIG. 1 through the plug-type coupling in an intermediate position of the plug-type coupling with a mating plug-type coupling partially inserted up to a sealing element, FIG. 11 is a sectional view through the plug-type coupling along the dividing line C-C according to FIG. 10, FIG. 12 is a sectional view through the plug-type coupling along the dividing line D-D according to FIG. 10.

In the various figures of the illustration, the same components are always identified with the same reference numerals.

DETAILED DESCRIPTION

For the following description note that the invention is not restricted to the exemplary embodiments and therefore not to all or multiple features of the described feature combinations; furthermore, every individual partial feature of each and every design example is also meaningful for the object of the invention separately from all other partial features described in combination, and also in combination with any features of another exemplary embodiment.

Figure 1:
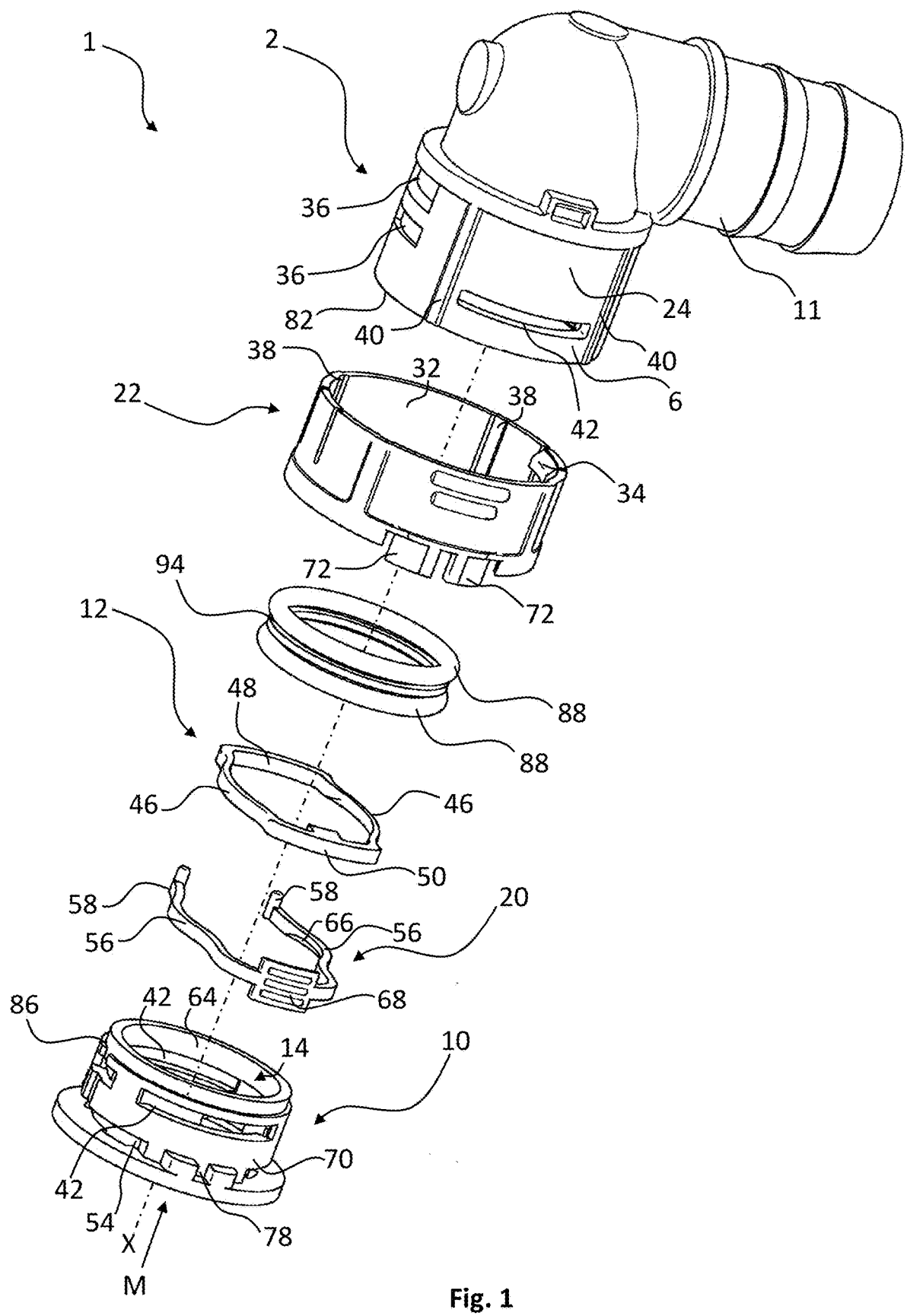
FIG. 1 is an exploded view of a plug-type coupling.

FIG. 1 shows a plug-type coupling 1 for connecting at least one first fluid line to a second fluid line which is designed with a mating plug-type coupling 18, or for connecting a sub-assembly which is designed with a mating plug-type coupling 18. The plug-type coupling 1 comprises a housing 2, see FIGS. 1 and 2, with a through-channel 4 depicted in FIGS. 7, 10, and 13.

Figure 2:
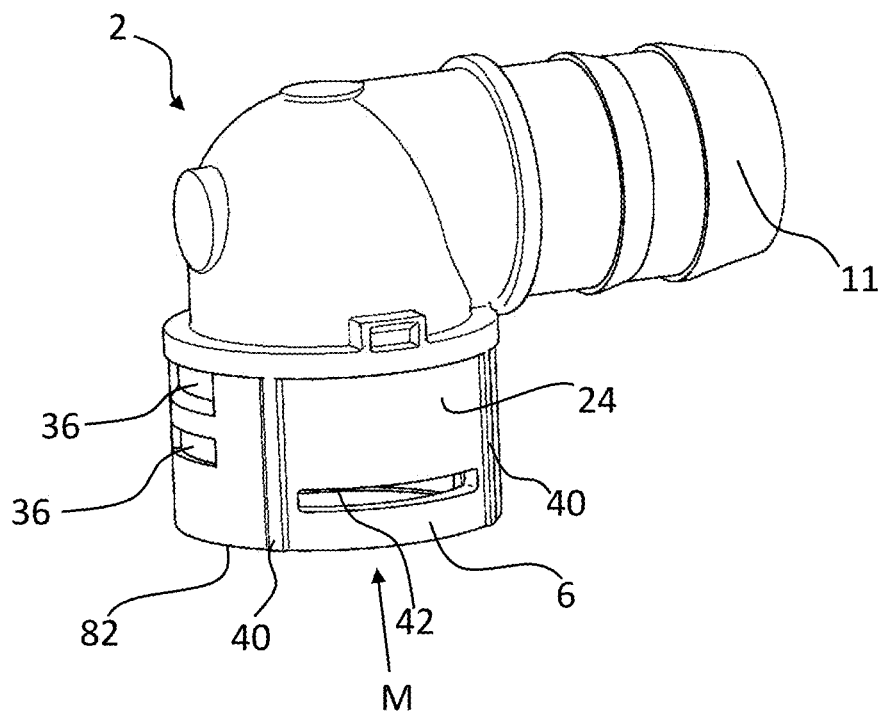
FIG. 2 is a perspective view of a housing of the plug-type coupling from FIG. 1.
Figure 3:
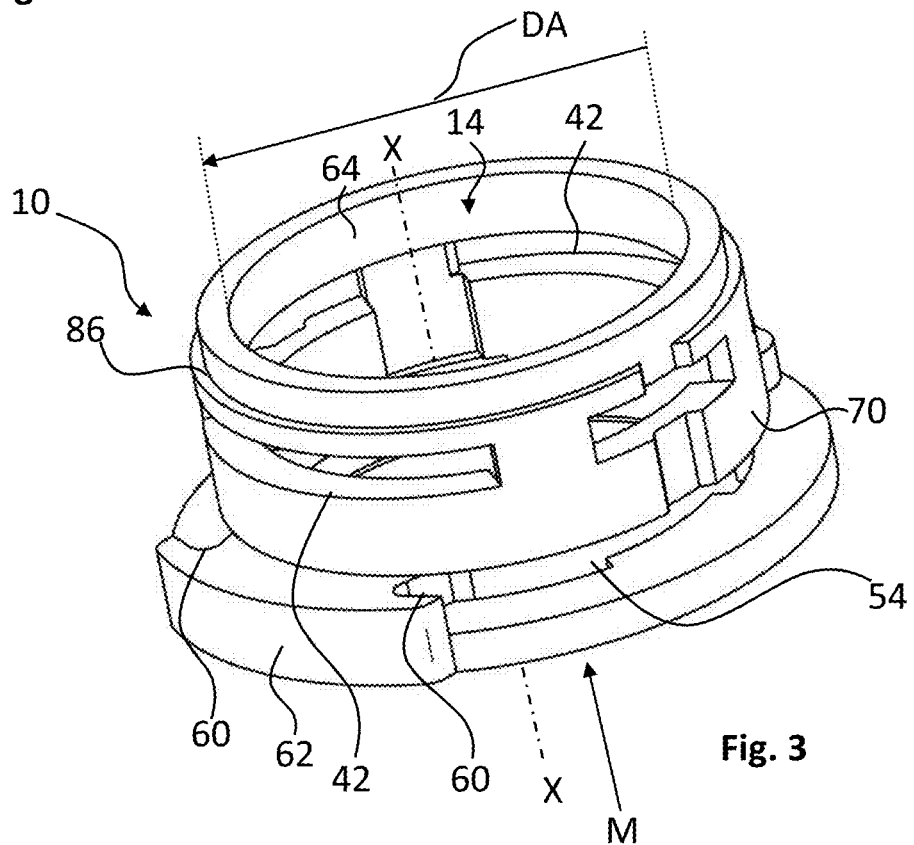
FIG. 3 is a perspective view of an adapter sleeve of the plug-type coupling from FIG. 1.

Corresponding to the depiction in FIGS. 1 and 2, one end of the housing 2 is designed as a sleeve section 6 with a receiving channel 8 which is fluidically connected to the through-channel 4, for receiving an adapter sleeve 10, depicted in FIGS. 1 and 3.

Likewise FIGS. 1 and 2 show that the housing 2 preferably features an insertion section 11 on the end opposite the sleeve section 6, for example for attachment of the first fluid line or of a line connector. This insertion section 11 can also be designed as a sleeve for insertion of a fluid line, however. Furthermore, the housing 2 can feature a second sleeve section on the opposite end from the sleeve section 6, which features one or more features of the sleeve section 6 of this invention. Alternately, on the end opposite the sleeve section 6 the housing can be directly connected to a sub-assembly, or can be connected to said sub-assembly in a friction-fit manner and/or a positive-locking manner and/or a materially-bonded manner.

The plug-type coupling 1 can additionally be designed as a right-angle connector, as depicted in FIG. 1. Alternately, the plug-type coupling 1 can have no angle between the sleeve section 6 and the opposite end, or an arbitrary angle can be designed between the sleeve section 6 and the opposite end. A T-shaped or Y-shaped plug-type coupling 1 is also possible. In particular, at least one end and at most each end is designed as a sleeve section 6.

Figure 7:
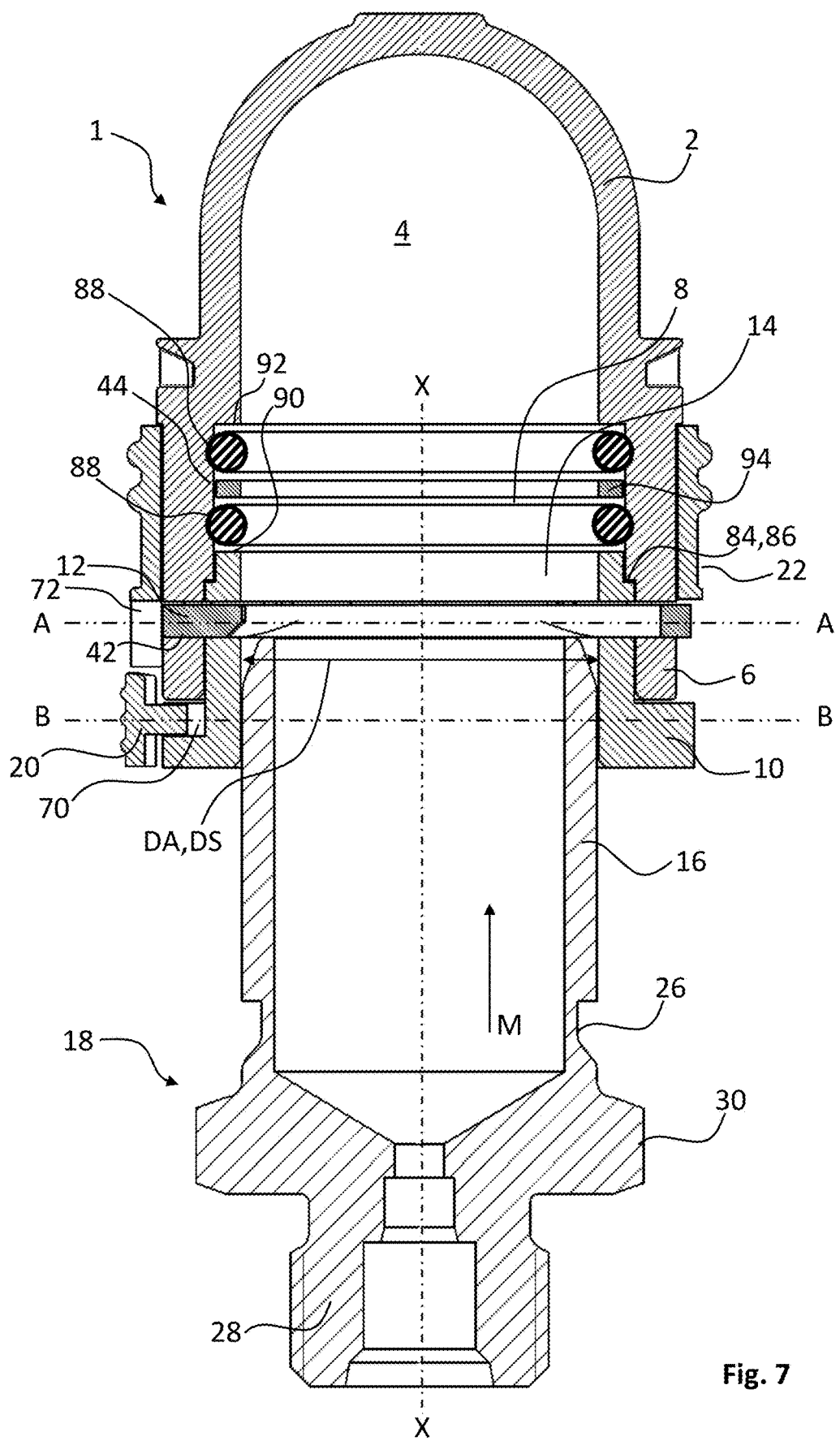
FIG. 7 is a sectional view along the assembly axis X according to FIG. 1 through the plug-type coupling in an intermediate position of the plug-type coupling with a mating plug-type coupling partially inserted up to a positive-locking element.
Figure 13:
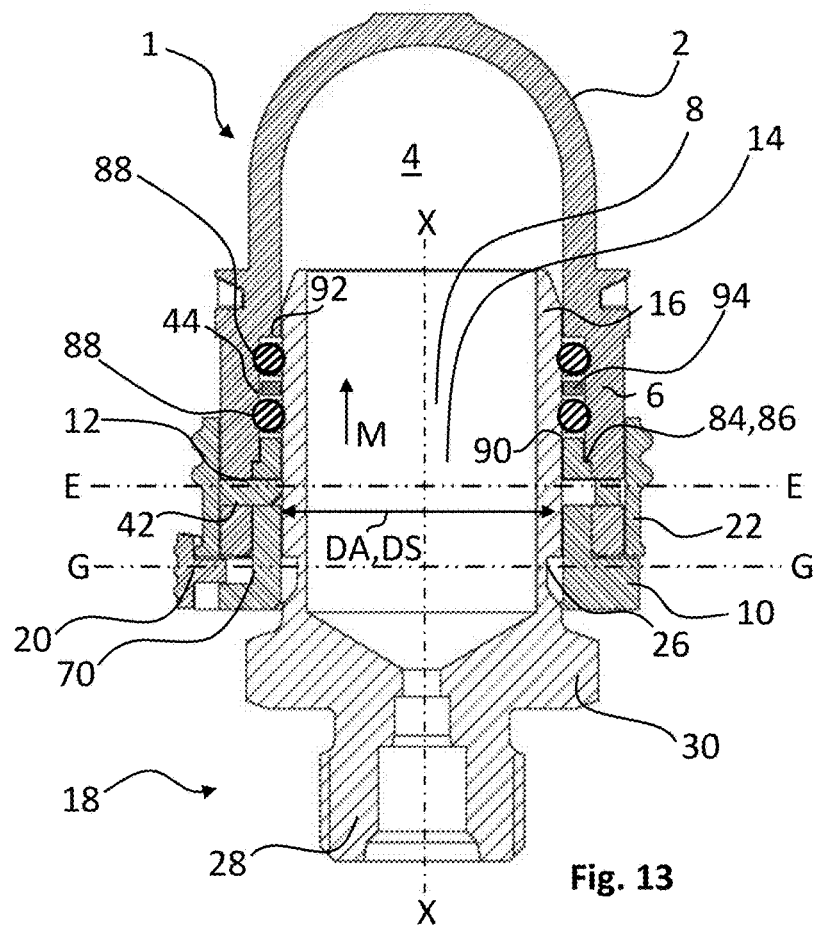
FIG. 13 is a sectional view along the assembly axis X according to FIG. 1 through the plug-type coupling in an assembled position of the plug-type coupling with fully inserted mating plug connector.

The adapter sleeve 10 can be inserted into the receiving channel 8 of the sleeve section 6 in an assembly direction M oriented axially to the assembly axis X. FIGS. 7, 10, and 13 show an adapter sleeve 10 arranged in the receiving channel 8 of the sleeve section 6.

The adapter sleeve 10 is depicted in FIGS. 1 and 3 and is retained detachably in the receiving channel 8 in an axial direction in a positive-locking manner. Corresponding to FIG. 3, the adapter sleeve 10 has a through-opening 14 designed for a plug shaft 16 of the mating plug-type coupling 18. The mating plug-type coupling 18 is depicted in FIGS. 7 to 15 to illustrate the method of operation.

Figure 5:
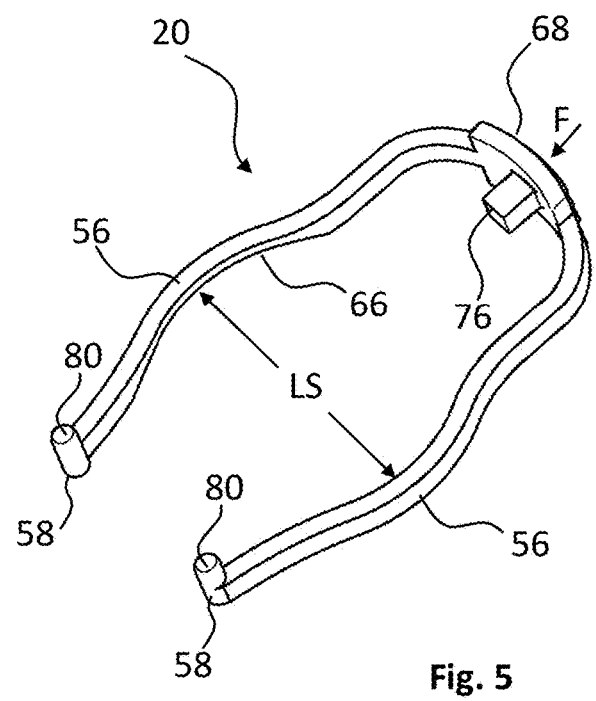
FIG. 5 is a perspective view of a retaining means of the plug-type coupling from FIG. 1.

Furthermore, the adapter sleeve 10 features a retaining means 20 depicted in FIGS. 1 and 5 for the purpose of detachable fixing of the mating plug-type coupling 18, wherein the retaining means 20 protrudes into the through-opening 14 in a resting state and is designed to be elastically expandable in a radial direction with respect to the assembly axis X in a tensioned state. The FIGS. 7, 9, 10, and 12 show the retaining means 20 in a tensioned state. In contrast, the retaining means 20 is depicted in a resting state in FIGS. 5, 13, 15, and 16.

The retaining means 20 can expediently be designed of plastic, metal, composite material, or an over-molded wire.

Figure 14:
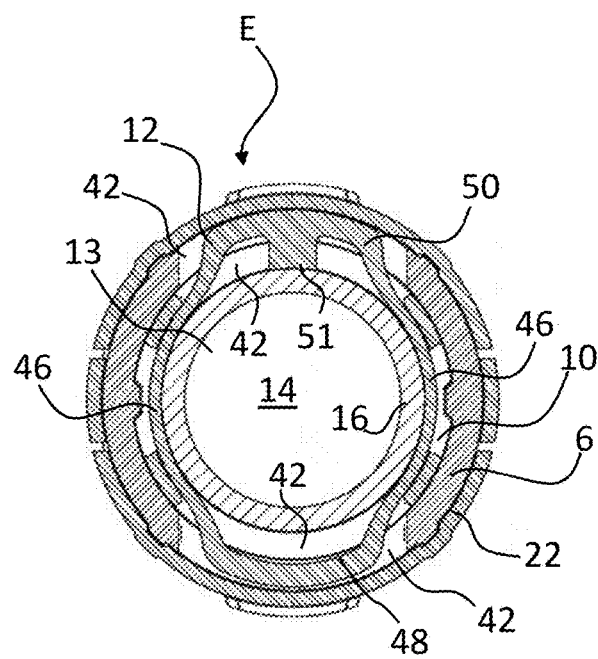
FIG. 14 is a sectional view through the plug-type coupling along the dividing line E-E according to FIG. 13.
Figure 15:
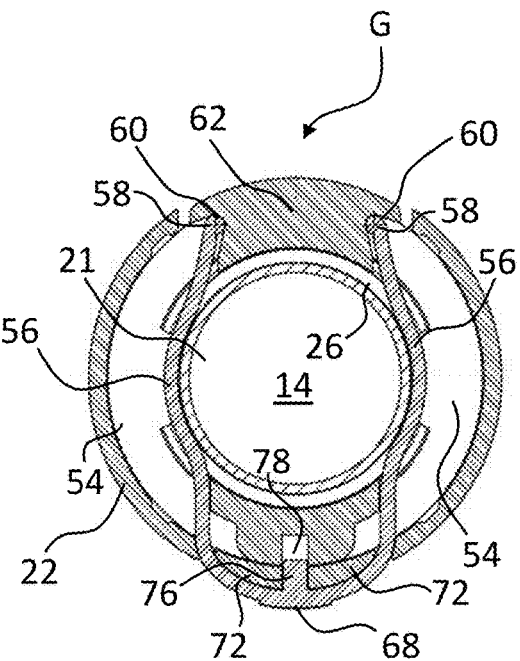
FIG. 15 is a sectional view through the plug-type coupling along the dividing line G-G according to FIG. 13.
Figure 16:
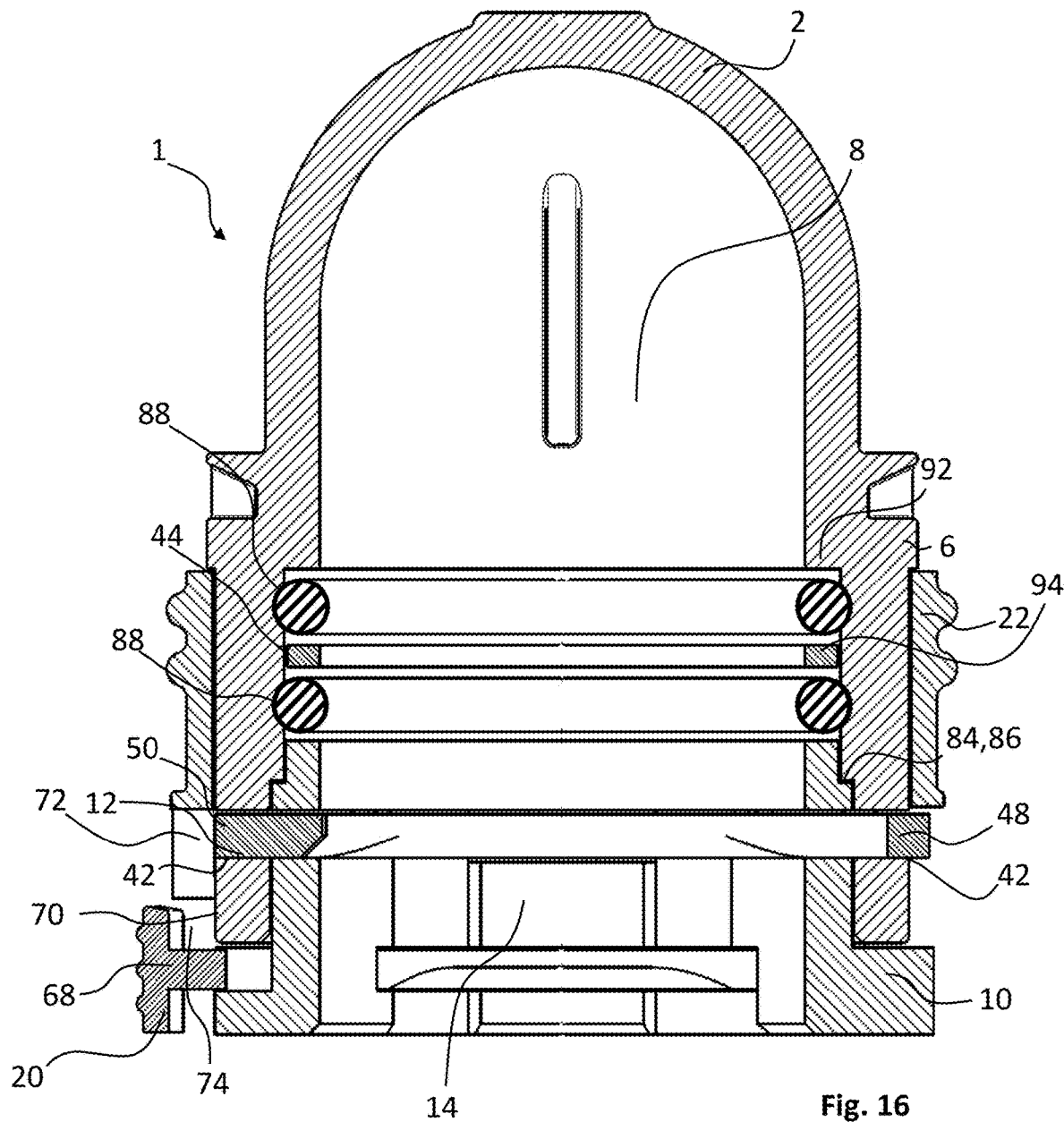
FIG. 16 is a sectional view along the assembly axis X according to FIG. 1 through the plug-type coupling in a pre-assembly position without an inserted mating plug connector.

In a pre-assembly position of the plug-type coupling 1, corresponding to the depiction in FIG. 16, the plug shaft 16 of the mating plug-type coupling 18 can be inserted into the through-opening 14 of the adapter sleeve 10, and in an assembled position of the plug-type coupling 1, depicted in FIGS. 13 to 15, the retaining means 20 blocks the mating plug-type coupling 18 axially to the assembly axis X. In FIGS. 7 to 9 and 10 to 12, the plug-type coupling is depicted in two intermediate positions with a respectively partially inserted mating plug-type coupling 18.

Figure 6:
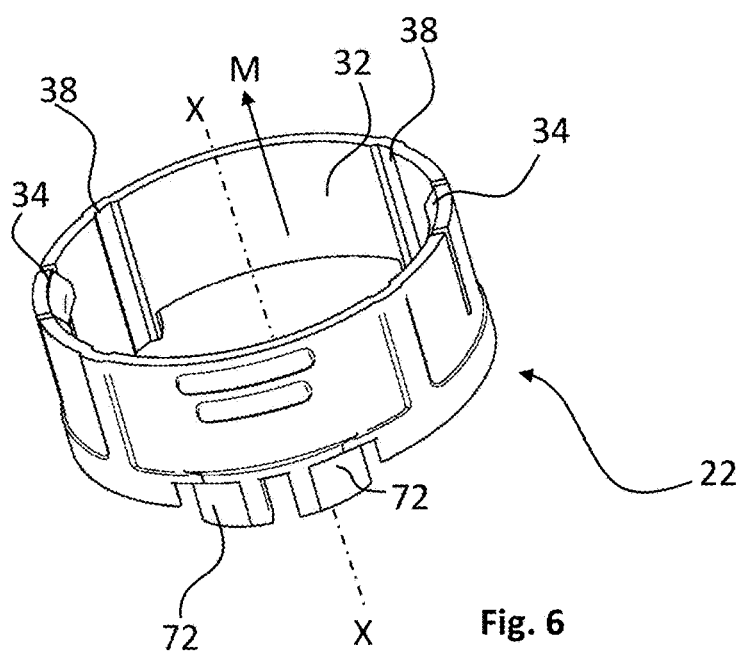
FIG. 6 is a perspective view of a locking element of the plug-type coupling from FIG. 1.

A locking element 22, depicted in FIGS. 1 and 6, which is movable in an axial direction relative to the assembly axis X is arranged on an outer circumference 24 of the sleeve section 6, movable from a release position which releases the retaining means 20 into a locking position which locks the retaining means 20.

The mating plug-type coupling 18 features a locking groove 26 in front of the plug shaft 16 when viewed in the assembly direction M. Preferably, the plug shaft 16 as well as the locking groove 26 are designed cylindrically with respect to the assembly axis M.

On the end of the mating plug-type coupling 18 opposite the plug shaft 16, a connecting segment 28 is provided for connecting a fluid line or a sub-assembly. Between the connecting segment 28 and the locking groove 26 of the mating plug-type coupling 18, an annular collar 30 is expediently designed, which can serve as a drive area for engagement of an assembly tool.

The length of the plug shaft 16 of the mating plug-type coupling 18 is expediently dimensioned such that in its state of being inserted into the adapter sleeve 10, as depicted in FIG. 13, it extends in the assembly direction M through the adapter sleeve 10, all the way through into the receiving channel 8 of the housing 2.

According to the invention, the locking element 22 is fixed on the sleeve section 6 at least axially to the assembly axis X against movement into the locking position when in its release position in the pre-assembly position of the plug-type coupling 1, as depicted in FIG. 16. The release position of the locking element 22 is depicted in FIGS. 7, 8, 10, 11, and 16. In this release position, in particular the plug shaft 16 is not inserted or only partially inserted into the through-opening 14 in the assembly direction M. The transfer into the locking position is expediently only made available when the plug shaft 16 of the mating plug-type coupling 18 has been moved far enough axially to the assembly axis X in the assembly direction M, in particular at the latest when the plug shaft 16 of the mating plug-type coupling 18 has assumed a position corresponding to the assembled position of the plug-type coupling 1 according to FIG. 13.

In the assembled position of the plug-type coupling 1, the locking element 22 subsequently prevents the retaining means 20 from deforming elastically into a tensioned state and prevents the mating plug-type coupling 18 from moving opposite the assembly direction M, in particular also in the assembly direction M, relative to the plug-type coupling 1. In particular, a separation of the mating plug-type coupling 18 from the plug-type coupling 1 is prevented.

Since the locking element 22 cannot block the retaining means 20 as long as the locking element 22 is blocked in its release position, this prevents the retaining means 20 from blocking the insertion of the plug shaft 16 of the mating plug-type coupling 18 in a pre-assembly position.

Preferably the locking element 22 is designed as cylindrical, as depicted in FIG. 6, wherein the locking element 22 preferably has a locking hook 34 formed on one inner wall, which can engage into a correspondingly designed locking groove 36 on the housing 2. The locking element 22 is thereby arranged on the housing 2 by means of an in particular friction-fitting and positive-locking designed latching connection, at least in the release position. Preferably, the latching connection serves to hold the plug-type coupling 1 in place for transport and storage, and can be released by means of force exerted by hand on the locking element 22 against the assembly direction M. In particular, the locking element 22 features two locking hooks 34 which are arranged opposite one another by 180° around the assembly axis X, as depicted in FIG. 6, wherein the housing 2 has at least one locking groove 36 formed for each locking hook 34, corresponding to the two locking hooks 34. It is particularly preferable that the housing 2 features locking grooves 36 offset axially with respect to the assembly axis X, as depicted in FIG. 2, so that the locking element 22 can be arranged in a locking manner on the housing 2 in various positions, in particular at least in the release position.

Preferably, the locking element features guide grooves 38 on its inner wall 32, running axially with respect to the assembly axis X, as depicted in FIG. 6. In particular when the locking element 22 is arranged on the outer circumference 24 of the sleeve section 6, it is advantageous that guide elements 40 which are designed axially with respect to the assembly axis X engage into the guide grooves 38 of the locking element 22 and preferably prevent twisting of the locking element 22 relative to the sleeve section 6 around the assembly axis X.

In one advantageous embodiment, a positive-locking element 12 fixes the adapter sleeve 10 in the receiving channel 8 in a positive-locking manner in an axial direction to the assembly axis X. The positive-locking element 12 expediently protrudes into the through-opening 14 in a resting state, wherein the cross-section of the through-opening 14 in the area of the positive-locking element 12 is narrowed. Preferably, the positive-locking element 12 is furthermore designed to be elastically expandable radially with respect to the assembly axis X into a tensioned state.

Axial movement of the locking element 22 from the release position into the locking position is expediently blocked by the positive-locking element 12 and is only released when the plug shaft 15 of the mating plug-type coupling 18 has been moved so far axially with respect to the assembly axis X that it has passed the area of the positive-locking element 12.

Figure 8:
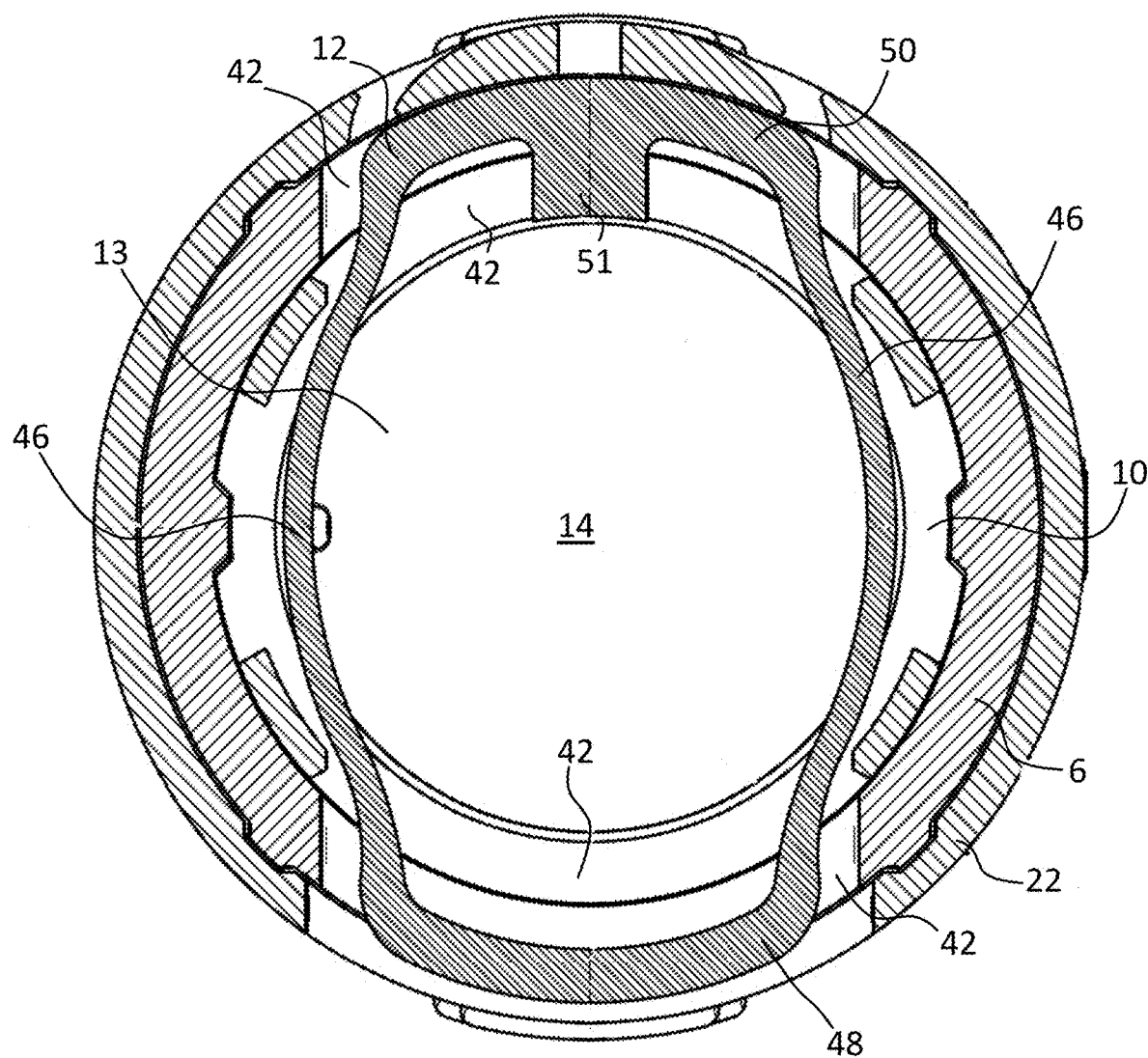
FIG. 8 is a sectional view through the plug-type coupling along the dividing line A-A according to FIG. 7.

In particular, the positive-locking element 12 features a guide-through opening 13, depicted in FIGS. 8, 11, and 14, which is enclosed around its entire circumference. In particular, the guide-through opening is enclosed around its entire circumference by clamping arms 46 which are connected to one another, and by the adapter sleeve 10. The circumference as well as the surface area of the guide-through opening 13 perpendicular to the assembly axis X is equal in the resting state as well as the tensioned state, so that the radial expansion also results in a radial contraction, offset from the expansion.

It is expedient that the positive-locking element 12 and/or the retaining means 20 are elastically expandable from their respective resting state into the tensioned state by means of an at-least radially outwardly-operating force with respect to the assembly axis X. The retaining means 20 and/or the positive-locking element 12 can thereby be designed, in particular angled, to correspond to the plug shaft 16 such that when the plug shaft 16 is moved in the assembly direction M by a force component acting radially upon the retaining means 20 and/or the positive-locking element 12, the retaining means 20 and/or the positive-locking element 12 are elastically expanded in their respective tensioned state.

In one embodiment of the invention, the sleeve section 6 and the adapter sleeve 10 respectively feature at least one opening 42 positioned radially with respect to the assembly axis X. The respective radial openings 42 are depicted in FIGS. 2 and 3. Preferably, at least one opening 42 of the adapter sleeve 10 and the sleeve section 6 respectively are arranged adjacent to one another in a fixed state of the adapter sleeve 10 in the sleeve section 6 such that the positive-locking element 12 can be inserted radially to the assembly axis X through the openings 42 of the adapter sleeve 10 and the sleeve section 6 into the through-opening 14 of the adapter sleeve 10. In particular, the positive-locking element 12 is inserted from outside the housing 2 radially with respect to the assembly axis X into the through-opening 14. Preferably, the positive-locking element 12 prevents both a twisting of the adapter sleeve 10 relative to the sleeve section 6 around the assembly axis X as well as an axial movement of the adapter sleeve 10 along the assembly axis X relative to the sleeve section 6.

In particular, the sleeve section 6 and the adapter sleeve 10 feature two openings 42 arranged respectively opposite each other by 180° radially with respect to the assembly axis X. Such an embodiment of the adapter sleeve 10 and the sleeve section 6 is depicted for example in FIG. 3. In this embodiment, the positive-locking element 12 can be inserted radially with respect to the assembly axis X through the openings 42 into the through-opening 14 of the sleeve section 6, wherein the positive-locking element 12 protrudes through the opposite openings 42 in the sleeve section 6 and the adapter sleeve 10. In particular, the openings 42 are overlapped by the locking element 22 on one side, as depicted in FIGS. 8, 11, and 16, so that the positive-locking element 12 can be arranged in the overlapped opening 42 and in the tensioned state a radial movement of the positive-locking element 12 through the overlapped opening 42 is blocked by means of the locking element 22. In particular, in this embodiment the positive-locking element 12 can be supported on the locking element 22, which overlaps the opening 42 on one side.

According to one advantageous embodiment, the positive-locking element 12 protrudes radially with respect to the assembly axis X from the opening 42 of the adapter sleeve 10 in the resting state. The positive-locking element 12 thereby expediently blocks the movement of the locking element 22 from its release position into the locking position when in the resting state. In particular, the locking element 22 is therefore fixed in the pre-assembly position of the plug-type coupling 1, as depicted in FIG. 16, or an intermediate position of the plug-type coupling 1, as depicted in FIGS. 7 and 8.

Figure 4:
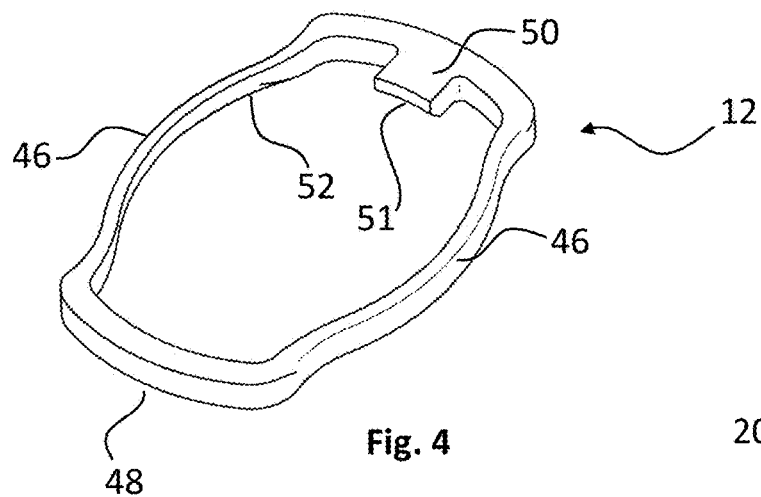
FIG. 4 is a perspective view of a positive-locking element of the plug-type coupling from FIG. 1.

It is particularly advantageous that the positive-locking element 12 is designed as a locking clamp, as depicted in FIG. 4. In particular, the positive-locking element 12 is designed with two clamping arms 46. The clamping arms 46 are expediently connected to one another on one side by at least one bridge 48. Preferably, the clamping arms 46 protrude into the through-opening 14 in the resting state of the positive-locking element 12 or of the locking clamps. In particular, the clamping arms 46 feature at least one abutment segment 50. Insofar as the clamping arms 46 are only connected to one another on one side by a bridge 48, each clamping arm 46 features its own abutment segment 50 on its end which protrudes into the sleeve section 6. Corresponding to an advantageous embodiment, see FIG. 4, the clamping arms 46 are connected via the abutment segment 50. Corresponding with FIGS. 8, 11, and 14, the abutment segment 50 is expediently arranged in an opening 42 in the sleeve section 6 and is overlapped by the locking element 22 on one side, as depicted in FIGS. 8, 11, 14, and 16.

According to an advantageous embodiment of the invention, as depicted in FIGS. 4, 8, 11, and 14, a support element 51 is arranged on the abutment segment 50, expediently designed as monolithic. The support element 51 advantageously protrudes into the through-opening 14 and can be supported on the plug shaft 16 of the mating plug-type coupling 18 in an assembled position—see FIG. 14—or in an intermediate position—see FIG. 11. It is advantageous that upon a radial expansion of the clamping arms 46, the radial support of the support element 51 causes solely the bridge 48 of the positive-locking element 12 to be elastically deformed radially with respect to the assembly axis X and relative to the sleeve section 6 in the direction of the assembly axis X. Preferably, by means of the support element 51 the relative position of the abutment segment 50 to the sleeve section 6 and/or to the mating plug-type coupling 18, as depicted in FIGS. 8, 11, and 14, remains constant before and after expansion of the clamping arms, that is, in the resting state as well as in the tensioned state of the positive-locking element 12.

Preferably, the clamping arms 46 are shaped such that in an installed state they are designed as curved around the assembly axis X, see FIGS. 8, 11, and 14. The curved shape facilitates that the plug shaft 16 has an enlarged contact surface with the clamping arms 46 upon insertion in the assembly direction M. This advantageously facilitates the radial elastic expansion of the clamping arms 46.

Furthermore, the side 52 of the clamping arms 46 which faces away from the assembly direction M in the installed state can be advantageously designed at least partially with a chamfer, as depicted in FIG. 4, wherein the radial distance of the clamping arms 46 across the chamfer is reduced in the assembly direction M. The chamfer makes the insertion of the plug shaft 16 easier and improves a redirection of force upon insertion in the assembly direction M, in that a force component operating axially is deflected by means of the chamfer into a force operating radially outward with respect to the assembly axis X and against an elastic force of the clamping arms 46.

In particular, in the tensioned state of the positive-locking element 12, the distance between the bridge 48 and the abutment segment 50, or rather the abutment segments 50, is reduced. The positive-locking element 12 is thereby advantageously pulled into the opening 42 completely in alignment with the outer circumference of the adapter sleeve 10. This embodiment advantageously has the effect that the locking element 22 is released for axial sliding by the tensioned state of the positive-locking element 12.

In particular, the radially-acting elasticity force of the clamping arms 46 is strong enough that the clamping arms 46 return to their original shape and the cross-section of the through-opening 14 of the adapter sleeve 10 narrows again when the plug shaft 16 is pulled from an inserted state against the assembly direction M from the through-opening 14 of the adapter sleeve 10. Furthermore, due to the return of the clamping arms 46 to their original shape, the distance between the bridge 48 and the abutment segment 50 increases, so that the bridge 48 protrudes from the opening 42 in the sleeve section 6 and blocks the locking element 22 in the release position.

Preferably, the adapter sleeve 10 features two open windows 54 positioned opposite one another at 180° radially with respect to the assembly axis X, as depicted in FIG. 3. In particular, the windows 54 are arranged axially separated from the openings 42 with respect to the assembly axis X. The windows 54 are furthermore expediently arranged offset by 90° to the openings 42 around the assembly axis X. The windows 54 advantageously facilitate the arrangement and guidance of the retaining means 20.

Figure 9:
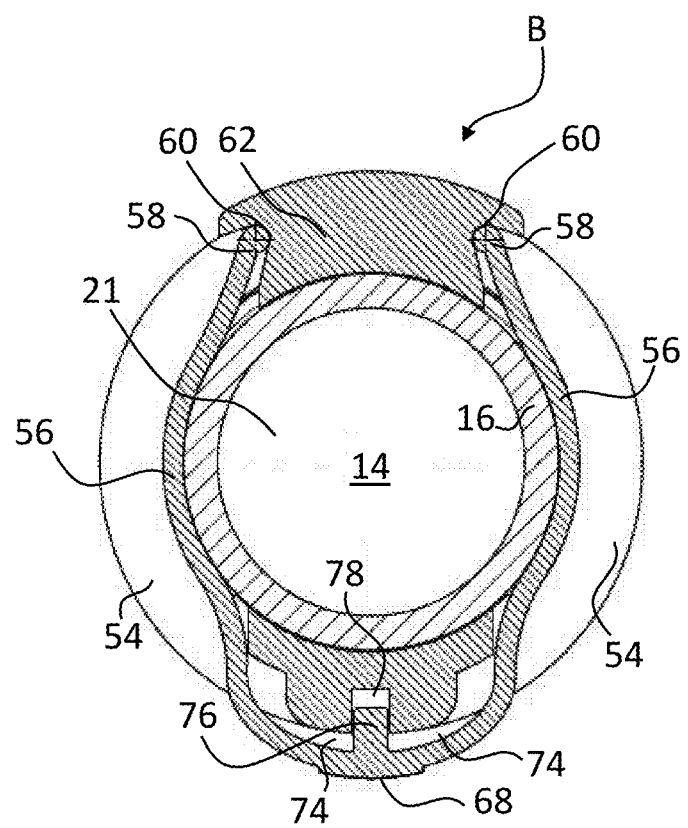
FIG. 9 is a sectional view through the plug-type coupling along the dividing line B-B according to FIG. 7.

According to one embodiment, the retaining means 20 features two retaining arms 56, as depicted in FIG. 5. With these retaining arms 56, the retaining means 20 surrounds the windows 54, as depicted for example in FIG. 9. In the resting state of the retaining means 20, the retaining means 20 preferably protrudes with the retaining arms 56 through the windows 54 into the through-opening 14 of the adapter sleeve 10. In particular, the retaining means 20 forms a guide-through opening 21 by means of retaining arms 56 connected to one another and/or preferably by means of retaining arms 56 and the adapter sleeve 10, as depicted in FIGS. 9, 12, and 15. The circumference as well as the surface area of the guide-through opening 21 perpendicular to the assembly axis X are equal in the resting state as well as in the tensioned state, so that the radial expansion also results in a radial contraction, offset from the expansion.

The plug shaft 16 of the mating plug-type coupling 18 expediently features a diameter DS—see FIG. 7—which is greater than the largest distance LS between the retaining arms 56 perpendicularly through the assembly axis X in the resting state of the retaining arms 56—see FIG. 5. In particular, a radially-acting elastic force of the retaining arms 56 in the direction of the assembly axis X is strong enough that, when the mating plug-type coupling 18 is inserted far enough into the through-opening 15 of the adapter sleeve 10 in the insertion direction, that the locking groove 26 is located adjacent to the retaining arms 56, as depicted in FIGS. 13 and 15, the retaining arms 56 return to their original shape and once again protrude into the through-opening 14 of the adapter sleeve 10. As a result, the retaining arms 56 are located in the locking groove 26 and block a movement of the mating plug-type coupling 18 in and/or against the assembly axis X.

The retaining arms 56 preferably feature at least one contact segment 58; the retaining arms 56 expediently each feature a contact segment 58. The retaining means 20 depicted in FIGS. 1, 5, 9, 12, and 15 corresponds to an advantageous embodiment and features two contact segments. An alternative embodiment could be designed with only one contact segment 58 which connects the retaining arms 56 corresponding to the abutment segment 50 of the positive-locking element 12 in FIG. 4.

Preferably, the respective contact segment 58 is arranged in a contact groove 60, which is designed in a contact element 62—see FIG. 3—or in an internal wall 64 of the adapter sleeve 10. It is especially advantageous that the retaining arms 56 can be supported in and hook into the contact groove 60 at least radially with respect to the assembly axis X and are thereby retained in an installed position in or on the adapter sleeve 10. By means of the contact grooves 60, as depicted in FIGS. 9, 12, and 15, the relative position of the contact segments 58 expediently remains constant before and after expansion of the retaining arms 56, that is, in the resting state as well as in the tensioned state of the positive-locking element 12. The retaining arms 56 expediently each respectively feature a contact segment 58, as depicted in FIG. 5, and are in particular arranged in two contact grooves 60 which are open in a circumferential direction, corresponding to FIGS. 9, 12, and 15, which are designed in the contact element 62.

Preferably, the contact groove 60 or the contact grooves 60 form a clamping connection for the retaining arms 56 or the contact segment 58. The clamping connection makes it possible that the retaining arms 56 can be supported radially to the assembly axis X in the contact grooves 60, as well as that the retaining means 20 can be prevented from separating and falling out of the adapter sleeve 10.

Preferably, the respective contact segment 58 features at least one pin 80 protruding axially with respect to the assembly direction M, which can engage into a hole corresponding to the pin 80 in one front face 82 of the sleeve section 6 which faces opposite the assembly direction M. The pin 80 is depicted in FIG. 5. The respective pin 80 is advantageously arranged radially with respect to the assembly direction M in the hole in a positive-locking manner and in particular secures the position of the retaining means 20 or the respective contact segment 58 in the respective contact groove 60. Alternately, in another embodiment (not depicted), the contact segment 58 features a pin facing opposite the assembly direction M, which can engage into a hole in the adapter sleeve 10. According to another embodiment (not depicted), the adapter sleeve 10 and/or the sleeve section 6 features a pin facing in the direction of the contact segment 58, which engages into a hole which is designed in the respective contact segment 58.

Preferably, the retaining arms 56 are shaped such that in an installed state they are designed as curved around the assembly axis X, as are in particular the clamping arms 46—see FIGS. 9, 12, and 15. As was described with regard to the clamping arms 46, the curved shape facilitates that the plug shaft 16 has an enlarged contact surface with the retaining arms 56 upon insertion in the assembly direction M. This advantageously facilitates the radial elastic deformation of the retaining arms 56.

Furthermore, the shape of the retaining arms 56 being curved around the assembly axis X has the advantage that in an assembled state with the mating plug-type coupling 18 fully inserted and fixed by the retaining means 20—see FIG. 13—an undesired detachment, in particular in the event of vibrations, is better prevented. Because the retaining arms 56 are designed as curved around the assembly axis X, the contact surface of the retaining arms 56 in the locking groove 26 of the mating plug-type coupling 18 in and against the assembly direction M is enlarged. The enlarged contact surface hinders a movement of the mating plug-type coupling 18 in or against the assembly direction M, or rather hinders an undesired separation of the mating plug-type coupling 18 from the plug-type coupling 1.

Corresponding to the embodiment of the positive-locking element 12, the side 66 of the retaining arms 56 which faces opposite the assembly direction M in the installed state can be designed at least partially with a chamfer, as depicted in FIG. 5. As described, the insertion of the mating plug-type coupling 18 and the radial expansion of the retaining arms 56 is thereby improved.

The retaining means 20 advantageously protrudes radially with respect to the assembly axis X from an outer circumference 70 of the adapter sleeve 10 with an actuation means 68, as depicted in FIGS. 7 and 9, 10 and 12, as well as 13, 15, and 16. In particular, the maximum radial distance of the actuation means 68 to an outer circumference 70 of the adapter sleeve 10 in the resting state is greater than when in the tensioned state.

According to a preferred embodiment, the retaining means 20 can be elastically deformed from the resting state into the expanded tensioned state by a force F—designated in FIG. 5—acting upon the actuation means 68 radially from the outside with respect to the assembly axis X. To this end, the actuation means 68 is preferably arranged opposite the contact groove 60 such that the contact groove 68 [sic] lies in a plane of the flow of force F. In particular, the retaining means 20 is supported by the force F acting radially upon the actuation means 68 with the contact segment(s) 58 in the contact groove(s) 60. The retaining means 20 is thereby compressed between the contact segment(s) 58 and the actuation means 68. This compression effects an enlargement of the distance between the retaining arms 56. The radial distance between the retaining arms 56 in the tensioned state or the compressed state is expediently at least as great as the diameter DS of the plug shaft 16. Corresponding to FIG. 13, this makes it possible that the axial movement of the mating plug-type coupling 18 with respect to the assembly axis X can be actively released from the outside by means of the radial force F when the retaining means 20 is in the resting state and is arranged in the locking groove 25 of the mating plug-type coupling 18 in the assembled state and fixes the mating plug-type coupling 18.

The narrowing of the distance between the contact segments 58 and the actuation means 68 in the tensioned state of the retaining means 20 advantageously causes a narrowing of the radial distance of the actuation means 68 to the outer circumference 70 of the adapter sleeve 10, as the retaining means 20 is arranged on one side with the contact segments 58 clamped in the contact grooves 60. The assembler thereby has a control opportunity over the assembled state of the plug-type coupling 1.

In particular, the reliability and insertion control are thereby improved, in that the retaining means 20 in the tensioned state blocks the movement of the locking element 22 from the release position into the locking position, in particular with the actuation means 68. As long as the retaining means 20 is in the tensioned state, the mating plug-type coupling 18 is not inserted into the through-opening 14 of the adapter sleeve 10 in the assembly direction M far enough and the plug-type coupling 1 remains in an intermediate position, corresponding to FIGS. 10 to 12.

In the intermediate position of the plug-type coupling 1, in particular the retaining element 20 and/or the positive-locking element 12 are expanded radially such that the movement of the locking element 22 into the locking position is blocked by the retaining element 20 and/or the positive-locking element 12. In particular, the positive-locking element 12 is radially expanded such that it does not block the movement of the locking element 22 into the locking position, wherein however the retaining means 20 abuts in particular against the plug shaft 16 of the mating plug-type coupling 18 and is in the tensioned state. This means that the locking element 22 cannot ultimately be transferred into the locking position.

According to another embodiment of the invention, the locking element 22 engages with at least one tab 72 protruding axially from the locking element 22 opposite the assembly direction M into a clearance space 74 in the assembled state. The clearance space 74 is expediently designed to pass axially between the actuation means 68 and the adapter sleeve 10. The locking element 22, which is depicted as an advantageous embodiment in FIG. 6, in particular features two tabs 72. The clearance spaces 74 are depicted for example in FIGS. 9 and 12. The locking element 22 fixes the retaining means 20 radially with respect to the assembly axis X in the resting state when the tab or the tabs 72 engage into the clearance spaces 74.

In particular, the clearance spaces 74 are designed to be dependent on the tensioned state or the resting state of the retaining means 20 such that the locking element 22 can only engage into the clearance spaces 74 with the tabs 72 when the retaining means 20 is in the resting state and the mating plug-type coupling 18 is completely inserted in the through-opening 14 of the adapter sleeve 10, as depicted in FIG. 15. The specified embodiment yields an additional insertion control for the assembler and reduces the risk of a faulty assembly.

In an additional embodiment, the retaining means 20 features guide means 76, as depicted in FIG. 5. The guide means 76 interacts in particular with at least one guide groove 78 designed on the adapter sleeve 10 such that the retaining means 20 diverts a force F acting from outside on the actuation means 68 which is not perpendicular to the assembly axis X, into a force F that acts perpendicular to the assembly axis X. Especially advantageously, the guide means 76 divides one clearance space 74 into two clearance spaces 74, as depicted in FIG. 15.

Preferably, the guide means 76 is designed as a pin facing radially with respect to the assembly axis X, which engages into a correspondingly designed guide groove 78 on the outer circumference 70 of the adapter sleeve 10, as depicted in FIGS. 9, 12, and 15.

As depicted in FIGS. 7, 10, and 13, the receiving channel 8 of the sleeve section 6 is advantageously subdivided into cylindrical segments, wherein the diameter of the respective segment increases in the opposite direction as the assembly direction M.

In particular, the receiving channel 8 features a ring-shaped first step surface 84 between a first and a second cylindrical segment. This first step surface 84 expediently serves as an insertion limiter, which limits the insertion depth of the adapter sleeve 10 in the assembly direction M. The adapter sleeve 10 features in particular a contact surface 86 which is also ring-shaped and designed to correspond to the step surface, and which faces in the assembly direction M. In the installed state of the adapter sleeve 10 in the receiving channel 8, the contact surface 86 of the adapter sleeve 10 rests against the first step surface 84.

It is particularly advantageous when at least one sealing element 88, in particular an O-ring, is arranged in the receiving channel 8, as depicted in FIGS. 7, 10, 13, and 15. Preferably, two sealing elements 88 are arranged in the receiving channel 8. The sealing element 88 is expediently arranged between a side wall 90 of the adapter sleeve 10 facing in the assembly direction M and a second step surface 92 facing away from the assembly direction M and extending perpendicularly from an inner wall 44 of the receiving channel 8. The sealing element 88 advantageously forms a seal against an inner wall 44 of the receiving channel 8.

According to an advantageous embodiment, the second step surface 92 reduces the diameter of the receiving channel 8 to the diameter DA of the through-opening 14 of the adapter sleeve 10.

It is particularly advantageous that the sealing element 88 acts to seal the plug shaft circumferentially relative to the sleeve section 6 or the inner wall 44 of the receiving channel 8.

A three-part seal has proven to be particularly advantageous, which is depicted in perspective view as an example in FIG. 1. In particular, the use of this three-part seal is only made possible by the inventive plug-type coupling 1, as the invention makes it possible to use an axially shorter adapter sleeve 10 with respect to the assembly axis X in comparison to the prior art.

The seal accordingly features two sealing elements 88, in particular O-rings, which are separated from one another by a spacer ring 94. This three-part group is then assembled in the through-opening 14 corresponding to the previously mentioned manner.

A preferred insertion process of the mating plug-type coupling 18 and the positions of the plug-type coupling 1 will be explained briefly below with the help of FIGS. 7, 10, 13, and 16 as well as their respective sectional views 8, 9, 11, 12, 14, and 15.

In the pre-assembly position, the mating plug-type coupling 18 has not yet been inserted into the through-opening 14, as depicted in FIG. 16. The retaining means 20 as well as the positive-locking element 12 are in the resting state. The locking element 22 is in the release position and is blocked from any movement into the locking position by the bridge 48 of the positive-locking element 12 which is protruding on one side from the opening 42. On the other side, the positive-locking element 12 is supported by the abutment segment 50 on the locking element, in particular on the tab 72. The retaining element 20 is thereby distanced by its actuation means 68 radially from the outer circumference 70 of the adapter sleeve 10 such that the clearance spaces 74 are opened.

In an intermediate position of the plug-type coupling 1, which is depicted in FIGS. 7 to 9, the mating plug-type coupling 18 is partially inserted in the assembly direction M until it reaches the area of the retaining means 20. The retaining means 20 is therefore in a radially expanded tensioned state due to the plug shaft 16. The actuation section 68 of the retaining means 12 [sic] is radially drawn in, whereby the clearance spaces 74 for the penetration of the tabs 72 are closed. The positive-locking element 12 remains in the resting state all the while and continues to block the locking element 22 in the release position.

In an additional intermediate position of the plug-type coupling 1, which is depicted in FIGS. 10 to 12, the mating plug-type coupling 18 is partially inserted further in the assembly direction M until it reaches the area of the positive-locking element 12. The positive-locking element 12 is then radially expanded by the plug shaft 16 into the tensioned state. The positive-locking element 12 is supported on one side by the support element 51 on the plug shaft 16, whereby the bridge 48 is pulled into the opening 42 completely in alignment with the outer circumference of the adapter sleeve 10. The axial sliding of the locking element 22 from the release position into the locking position is preferably still not possible or only slightly possible. The retaining means 20 continues to be in the radially expanded tensioned state as previously described. The clearance spaces 74 are therefore closed for the penetration of the tabs 72. The tabs 72 preferably continue to rest against the actuation means 68 or come to rest on the actuation means 68 with an axial sliding of the locking element 22, whereby in both cases any further sliding into the locking position is blocked.

The assembly position of the plug-type coupling 1 is depicted in FIGS. 13 to 15. Thus the mating plug-type coupling 18 is inserted completely and correctly in the assembly direction M. The positive-locking element 12 continues to be in the tensioned state and the blockage of the positive-locking element for the locking element 22 is released. The locking groove 26 of the mating plug-type coupling 18 is now in the area of the retaining means 20, whereby this in turn has elastically returned to the resting state and protrudes into the locking groove 26. The mating plug-type coupling 18 is thereby protected against axial displacement. Due to the resting position of the retaining means 20, the radial distance of the actuation means 68 to the outer circumference 70 of the adapter sleeve 10 has once again been increased, whereby the blockage for the locking element 22 is once again released. The locking element 22 can therefore be completely slid axially with respect to the assembly axis X into the locking position and the tabs can penetrate into the clearance spaces 74. In this assembled position, the locking element blocks the retaining means 22 [sic] on the actuation means 68 against radial displacement and thus against undesired expansion into the tensioned state of the retaining means 20.

The insertion example makes clear that the tabs 72 have a threefold function in principle. On the one hand, they serve as an abutment and/or support surface for the abutment segment 50 of the positive-locking element 12, whereby the positive-locking element 12 retracts in a defined manner only on one side. On the other hand, the tabs 72 block the axial displacement of the locking element 22 on the actuation means 68. In a further aspect, the tabs 72 block the retaining element 20 in the resting state and prevent an accidental disengagement of the mating plug-type coupling 18.

The invention is not limited to the depicted and described exemplary embodiments, but rather encompasses all designs of equivalent function in the sense of the invention. It is explicitly noted that the exemplary embodiments are not limited to all individual features in combination, but rather each individual feature can be meaningful to the invention independently of all other individual features. Furthermore, the invention has hitherto not been restricted to the combination of features as described in claim 1, but rather can also be defined by any other desired combination of features of all of the features described in total. This means that in essence practically every individual feature of claim 1 can be omitted or replaced by at least one other feature described elsewhere in this application.

The invention claimed is:

1. A connector for connecting at least one first fluid line to a second fluid line designed with a mating connector or for connecting a sub-assembly designed with a mating connector, comprising:

a housing with a through-channel, wherein one end of the housing is designed as a sleeve section with a receiving channel which is fluidically connected to the through-channel for receiving an adapter sleeve, the adapter sleeve configured to be inserted into the receiving channel of the sleeve section in an assembly direction which is oriented axially with respect to an assembly axis and is held detachably in an axial direction in the receiving channel, wherein the adapter sleeve having a through-opening designed for a plug shaft of the mating connector, a retaining means mounted onto the adapter sleeve for the detachable fixing of the mating connector to the adapter sleeve, wherein the retaining means protrudes into the through-opening in a resting state and is radially elastically expandable with respect to the assembly axis in a tensioned state, and the plug shaft of the mating connector being configured to be inserted into the through-opening of the adapter sleeve in a pre-assembly position of the connector, and in an assembled state of the connector the retaining means can block the mating connector axially with respect to the assembly axis, wherein a locking element being axially movable with respect to the assembly axis is arranged in a movable manner on an outer circumference of the sleeve section from a release position which releases the retaining means into a locking position which locks the retaining means, wherein the locking element in its release position in the pre-assembly position of the connector is fixed on the sleeve section at least axially against movement into the locking position; and a positive-locking element extending around the adapter sleeve and that fixes the adapter sleeve in the receiving channel in an axial direction with respect to the assembly axis and protrudes into the through-opening in a resting state preventing disengagement of the adapter sleeve from the sleeve section and is designed to be elastically expandable in a tensioned state in a radial direction with respect to the assembly axis permitting disengagement of the adapter sleeve from the sleeve section.

2. The connector according to claim 1, wherein the sleeve section and the adapter sleeve each respectively feature at least one radial opening with respect to the assembly axis, wherein at least one opening of the adapter sleeve and the sleeve section respectively are arranged adjacent to one another in a fixed state of the adapter sleeve in the sleeve section such that the positive-locking element can be inserted radially to the assembly axis through the openings of the adapter sleeve and the sleeve section into the through-opening of the adapter sleeve.

3. The connector according to claim 2, wherein the positive-locking element protrudes radially with respect to the assembly axis out of the opening of the adapter sleeve in the resting state, whereby the positive-locking element blocks the movement of the locking element from the release position into the locking position in the resting state.

4. The connector according to claim 2, wherein the adapter sleeve features two windows opposite one another by 180°, which are open radially with respect to the assembly axis and are arranged offset from the openings axially with respect to the assembly axis, wherein the retaining means features two retaining arms, with which it surrounds the windows and protrudes through the windows into the through-opening of the adapter sleeve with the retaining arms when in the resting state.

5. The connector according to claim 4, wherein the retaining arms feature at least one contact segment, wherein the contact segment is arranged in a contact groove, which is designed in a contact element or an inner wall of the adapter sleeve.

6. The connector according to claim 5, wherein the retaining arms each feature a contact segment.

7. The connector according to claim 5, wherein the retaining arms are arranged in two contact grooves open in a circumferential direction, which are designed in the contact element, wherein the retaining arms are supported with and can hook into at least one contact segment in the contact groove radially with respect to the assembly axis and thereby can be held in an installation position in or on the adapter sleeve.

8. The connector according to claim 4, wherein the two windows are arranged offset by 90° to the openings around the assembly axis.

9. The connector according to claim 1, wherein the form fit positive-locking element is designed as a locking clamp and has two clamping arms which protrude into the through-opening in the resting state, wherein the clamping arms feature at least one abutment segment.

10. The connector according to claim 9, wherein a support element is arranged on the abutment segment, which protrudes into the through-opening and can be supported on the plug shaft of the mating connector.

11. The connector according to claim 9, wherein the clamping arms are connected via the abutment segment, wherein the abutment segment is arranged in an opening in the sleeve section and is surrounded on one side by the locking element.

12. The connector according to claim 9, wherein, in an assembled position, the support element can be supported on the plug shaft of the mating connector.

13. The connector according to claim 1, wherein the retaining means is distanced from an outer circumference of the adapter sleeve radially with respect to the assembly axis with an actuation means, wherein the maximum radial distance of the actuation means to the outer circumference of the adapter sleeve is greater in the resting state than in the tensioned state.

14. The connector according to claim 13, wherein the retaining means can be elastically deformed from the resting state into the expanded tensioned state by a force F acting radially on the actuation means from the outside, wherein the actuation means is arranged opposite the contact groove, and the retaining means is supported radially with respect to the assembly axis with the contact segment in the contact groove.

15. The connector according to claim 14, wherein the locking element extends through a clearance space which leads axially between the actuation means of the retaining means and the adapter sleeve, with at least one tab which protrudes axially from the locking element against the assembly direction in an assembled state, wherein the locking element fixes the retaining means radially with respect to the assembly axis in the resting state.

16. The connector according to claim 14, wherein the retaining means features guide means.

17. The connector according to claim 16, wherein the guide means interact with at least one guide groove designed on the adapter sleeve such that a force acting from outside on the actuation means which is not perpendicular to the assembly axis is diverted into a force that acts perpendicular to the assembly axis.

18. The connector according to claim 13, wherein the retaining means in the tensioned state blocks with the actuation means the movement of the locking element from the release position into the locking position.

19. The connector according to claim 18, wherein at least two sealing elements are arranged in the receiving channel.

20. The connector according to claim 1, wherein the retaining means in the tensioned state blocks the movement of the locking element from the release position into the locking position.

21. The connector according to claim 1, wherein at least one sealing element is arranged in the receiving channel, and the sealing element is arranged between a side wall of the adapter sleeve which faces in the assembly direction and a step surface which faces away from the assembly direction and extends perpendicularly from an inner wall of the receiving channel, wherein the sealing element makes a seal against an inner wall of the receiving channel.

* * * * *